US009182496B2

(12) United States Patent  
Katayama et al.

(10) Patent No.: US 9,182,496 B2  
(45) Date of Patent: Nov. 10, 2015

(54) ACCESS METHOD FOR COMMUNICATION TERMINAL

(75) Inventors: Hideyuki Katayama, Shizuoka (JP); Masahiko Yahagi, Tokyo (JP)

(73) Assignee: NEC PLATFORMS, LTD., Kawasaki (JP)

( * ) Notice: Subject to any disclaimer, the term of this patent is extended or adjusted under 35 U.S.C. 154(b) by 332 days.

(21) Appl. No.: 13/055,811

(22) PCT Filed: Jul. 15, 2009

(86) PCT No.: PCT/JP2009/062807  
§ 371 (c)(1),  
(2), (4) Date: Jan. 25, 2011

(87) PCT Pub. No.: WO2010/018730  
PCT Pub. Date: Feb. 18, 2010

(65) Prior Publication Data  
US 2011/0122826 A1 May 26, 2011

(30) Foreign Application Priority Data  
Aug. 14, 2008 (JP) .................................. 2008-208976

(51) Int. Cl.  
*G01S 19/42* (2010.01)  
*H04W 48/08* (2009.01)

(52) U.S. Cl.  
CPC ....... *G01S 19/42* (2013.01); *H04B 2201/70715* (2013.01); *H04W 48/08* (2013.01)

(58) Field of Classification Search  
CPC ......... H04L 2012/5606; H04W 84/12; H04W 88/08; H04W 80/04; H04W 88/06; H04W 84/18; H04W 52/40; H04W 48/08; H04B 7/0617; H04B 7/04; G01S 19/42

USPC .......... 370/310.2, 328, 334; 455/456.1, 456.3  
See application file for complete search history.

(56) References Cited

U.S. PATENT DOCUMENTS 5,857,155 A * 1/1999 Hill et al. ................... 455/456.3  
8,233,917 B2 * 7/2012 Bae ............................. 455/456.3

(Continued)

FOREIGN PATENT DOCUMENTS

EP        1 830 596 A1    9/2007  
JP       2004289487 A   10/2004

(Continued)

OTHER PUBLICATIONS

International Search Report for PCT/JP2009/062807 mailed Nov. 2, 2009.  
The extended European search report for EP Application No. 09 80 6626, dated on Jul. 30, 2013.

*Primary Examiner* — Mark Rinehart  
*Assistant Examiner* — Natali N Pascual Peguero

(57) ABSTRACT

A communication terminal acquires positional information indicating the position at which the communication terminal exists, from a GPS satellite, determines a range of correspondence information to be acquired, from among the correspondence information that makes the positional information indicating position identified by latitude and longitude correspondent to the frequency to be used at that position and that is stored in a server, based on the acquired positional information, acquires the correspondence information included in the determined range, from the sever, and, identifies the frequency to be used between the communication terminal and the radio base station to be connected to the communication terminal, based on the acquired positional information and the correspondence information included in the range.

7 Claims, 12 Drawing Sheets

(56) References Cited

U.S. PATENT DOCUMENTS

2004/0204032 A1* 10/2004 Hisano et al. .............. 455/552.1
2007/0004404 A1   1/2007 Buckley et al.

FOREIGN PATENT DOCUMENTS

JP          2005277507 A      10/2005
JP          2006135955 A       5/2006

* cited by examiner

Fig.8

| latitude | longitude | positional information |
|---|---|---|
| 00 | 00 | block 1 |
|  | 01 | block 2 |
|  | 10 | block 3 |
|  | 11 | block 4 |
| 01 | 00 | block 5 |
|  | 01 | block 6 |
|  | 10 | block 7 |
|  | 11 | block 8 |
| 10 | 00 | block 9 |
|  | 01 | block 10 |
|  | 10 | block 11 |
|  | 11 | block 12 |
| 11 | 00 | block 13 |
|  | 01 | block 14 |
|  | 10 | block 15 |
|  | 11 | block 16 |

Fig.9

| positional information | frequency |
|---|---|
| block 1 | f1 |
| block 2 | f2 |
| block 3 | f3 |
| ⋮ | ⋮ |
| block 15 | f5 |
| block 16 | f6 |

ACCESS METHOD FOR COMMUNICATION TERMINAL

This application is the National Phase of PCT/JP2009/062807, filed Jul. 15, 2009, which claims priority based on Japanese Patent Application 2008-208976 filed on Aug. 14, 2008, and should incorporate all the disclosure thereof herein.

TECHNICAL FIELD

The present invention relates to a communication terminal for communicating, with a radio base station and a connecting method and program for a communication terminal to connect with a radio base station.

BACKGROUND ART

In a radio communication system using radio technology, a communication terminal realizes a network connection by exchanging various kinds of data by establishing synchronization with the synchronizing signal sent out from a radio base station.

FIG. 1 is a diagram showing one mode of a typical radio communication system.

The radio communication system shown in FIG. 1 includes terminal 1001, base station 1002 and network 1003.

Terminal 1001 is a communication terminal having a radio communication function. For example, a mobile phone and a mobile terminal can be mentioned.

Base station 1002 is a radio base station that connects terminal 1001 with network 1003.

Network 1003 is a communication network, for example, may be a WiMAX (Worldwide Interoperability for Microwave Access) network.

Here, data to be transmitted and received between terminal 1001 and base station 1002 have to be transmitted and received in synchronization with the aforementioned synchronizing signal. Accordingly, terminal 1001 needs to detect the time (temporal position) of transmission of the synchronizing signal transmitted from base station 1002.

In order for terminal 1001 to detect the synchronizing signal transmitted from base station 1002, it is common for a search to be performed by switching from one frequency to another, the received electric field of which is detected at terminal 1001.

FIG. 2 is a diagram showing a format of data frames transmitted and received between terminal 1001 and base station 1002 when network 1003 shown in FIG. 1 is a WiMAX network.

As shown in FIG. 2, the data frame transmitted and received between terminal 1001 and base station 1002 is configured of a preamble indicating the lead of the data frame, DL or downlink data, UL or uplink data and TTG/RTG or Gap time for absorbing propagation delay between terminal 1001 and base station 1002. Here, the preamble is used as the synchronizing signal for establishing synchronization between terminal 1001 and base station 1002. This data frame is transmitted and received between base station 1002 and terminal 1001 in a predetermined cycle (in a cycle of 5 ms in a WiMAX system).

FIG. 3 is a sequence diagram for illustrating a typical synchronizing signal searching process at terminal 1001 in the radio communication system shown in FIG. 1. In this case, description will be made taking an example where a synchronizing signal is transmitted from base station 1002 using frequency f2.

A synchronizing signal is periodically transmitted from base station 1002 using frequency f2.

First, at Step 11, a synchronizing signal search is performed at frequency f1 by means of terminal 1001.

Since no synchronizing signal is detected at frequency f1, a synchronizing signal search is performed by changing the frequency to f2 at Step 12.

Since the synchronizing signal transmitted from base station 1002 is transmitted using frequency f2, the synchronizing signal is detected in the search process at Step 12.

Then, at Step 13, connection to network 1003 via base station 1002 is completed using frequency f2 at which the synchronizing signal was detected.

However, when synchronizing signal Searches are sequentially performed by switching the frequency, since search processes need to be done for the frequencies at which no synchronizing signal exists, time is wasted for unnecessary searching processes so that it takes time to detect the synchronizing signal.

To address this problem, a technology exists that is used for identifying the frequency in accordance with the position of a communication terminal (mobile unit), by making the communication terminal store the correspondence between positional information represented by latitude and longitude and the information on the frequency used at that position (see JP2006-135955A, for example).

However, in the technology disclosed in JP2006-135955A, the frequency information associated with positional information represented by each latitude and each longitude needs to be stored in the communication terminal, hence there occurs the problem in which a large-scale storage area is needed for the communication terminal.

The object of the present invention is to provide a communication terminal and a connecting method and program for solving the above problems.

In order to attain the above object, the present invention resides in a communication terminal having a radio communicating function, comprising:

a GPS module that acquires positional information from a GPS satellite, indicating the position at which the communication terminal is present; and, a controller which determines a range of correspondence information to be acquired, form among the correspondence information that makes the positional information indicating position identified by latitude and longitude correspondent to the frequency to be used at that position and that is stored in a server, based on the positional information acquired by the GPS module; and, a receiver that acquires the correspondence information included in the range from the sever, wherein the controller, based on the positional information acquired by the GPS module and the correspondence information acquired by the receiver, identifies the frequency to be used between the communication terminal and a radio base station to be connected to the communication terminal.

Also, the present invention resides in a connecting method for connecting a communication terminal to a network through a radio base station, comprising the steps of:

acquiring positional information from a GPS satellite, indicating the position at which the communication terminal is present;

determining a range of correspondence information to be acquired, from among the correspondence information that makes the positional information indicating position identified by latitude and longitude correspondent to the frequency to be used at that position and that is stored in a server, based on the acquired positional information;

acquiring the correspondence information included in the range from the sever; and, identifying the frequency to be used between the communication terminal and the radio base station to be connected to the communication terminal, based on the acquired positional information and the correspondence information included in the range.

Also the present invention reside in a program that causes a communication terminal having a radio communication function to execute:

a procedure of acquiring positional information from a GPS satellite, indicating the position at which the communication terminal is present;

a procedure of determining a range of correspondence information to be acquired, from among the correspondence information that makes the positional information indicating position identified by latitude and longitude correspondent to the frequency to be used at that position and that is stored in a server; based on the acquired positional information;

a procedure of acquiring the correspondence information included in the range from the sever; and, a procedure of identifying the frequency to be used between the communication terminal and the radio base station to be connected to the communication terminal, based on the acquired positional information and the correspondence information included in the range.

As described heretofore, the present invention is constructed such that a communication terminal acquires positional information indicating the position at which the communication terminal is present, from a GPS satellite, determines a range of correspondence information to be acquired, from among the correspondence information that makes the positional information indicating position identified by latitude and longitude correspondent to the frequency to be used at that position and that is stored in a server, based on the acquired positional information, acquires the correspondence information included in the determined range, from the sever, and, identifies the frequency to be used between the communication terminal and the radio base station to be connected to the communication terminal, based on the acquired positional information and the correspondence information included in the range. It is therefore possible to easily shorten the time for a terminal to connect to a network and also to easily cut down the power consumption that is required for establishing a connection.

BRIEF DESCRIPTION OF THE DRAWINGS

FIG. 8 is a diagram showing one example of a configuration of a block identifying table stored in the storage shown in FIG. 5.

FIG. 9 is a diagram showing one example of a configuration of a frequency identifying table stored in the storage shown in FIG. 5.

MODE FOR CARRYING OUT THE INVENTION

Now, the exemplary embodiment of the present invention will be described with reference to the drawings.

Figure 4:
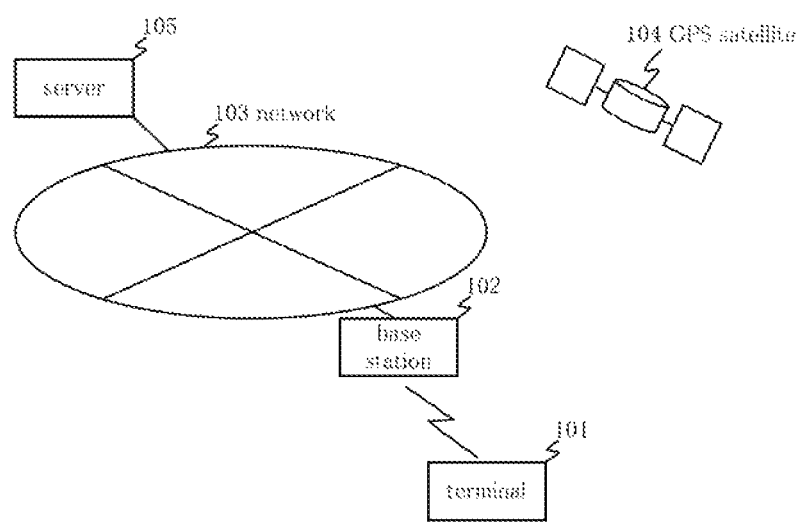
FIG. 4 is a diagram showing one exemplary embodiment of a communication terminal of the present invention.

FIG. 4 is a diagram showing one exemplary embodiment of a communication terminal of the present invention.

As shown in FIG. 4, the present embodiment is configured of terminal 101, base station 102, network 103, GPS satellite 104 and server 105.

Terminal 101 is a communication terminal having a radio communication function. For example, a mobile phone and a mobile terminal can be mentioned. Further, terminal 101 has a GPS (Global Positioning System) receiving function.

Base station 102 is a radio base station that connects terminal 101 and network 103.

Network 103 is a communication network, for example, may be a WiMAX (Worldwide Interoperability for Microwave Access) network.

GPS satellite 104 is a general satellite that transmits time information and positional information on terminal 101 to terminal 101.

Server 105 stores correspondence information on the association between positional information that indicates a position identified by the latitude and longitude and the frequency used at that position.

Figure 5:
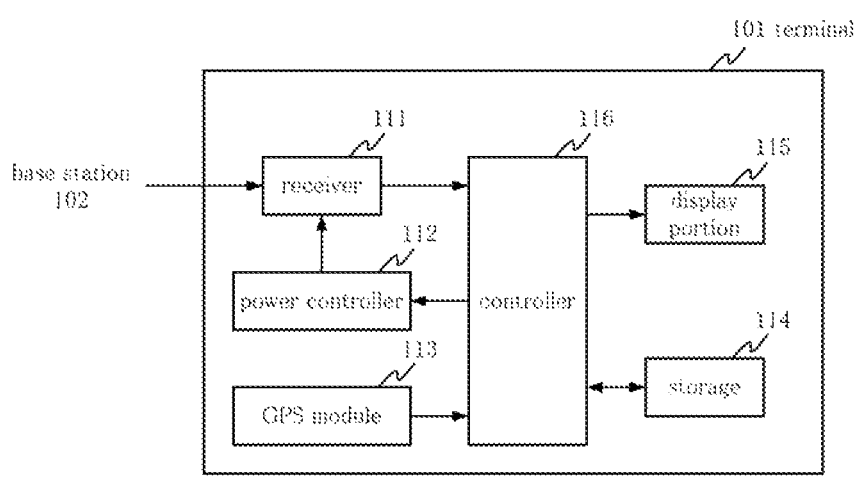
FIG. 5 is a diagram showing one example of the internal configuration of the terminal shown in FIG. 4.

FIG. 5 is a diagram showing one example of the internal configuration of terminal 101 shown in FIG. 4.

Terminal 101 shown in FIG. 4 includes receiver 111, power controller 112, GPS module 113, storage 114, display portion 115 and controller 116 for controlling these, devices as shown in FIG. 5.

Receiver 111 receives radio signals transmitted from base station 102. The received signal is converted into an electric signal and output to controller 116.

Power controller 112 performs radio power control when performing a process for detecting a synchronizing signal.

GPS module 113 is a general module for acquiring time information and positional information transmitted from GPS satellite 104.

Storage 114 is a memory for storing information.

Display portion 115 is a general display for displaying information.

Controller 116 controls these constituents. Controller 116 also performs a search process for a synchronizing signal based on the information stored in storage 114 and a signal output from receiver 111. Controller 116 also stores the aftermentioned correspondence information, among the signal output from receiver 111 into Storage 114.

Here in FIG. 5, among the constituents of terminal 101 shown in FIG. 4 the constituents that are involved in the present invention alone are shown.

Next, the connecting method of establishing a connection between terminal 101 and base station 102 in the present embodiment will be described.

Figure 6:
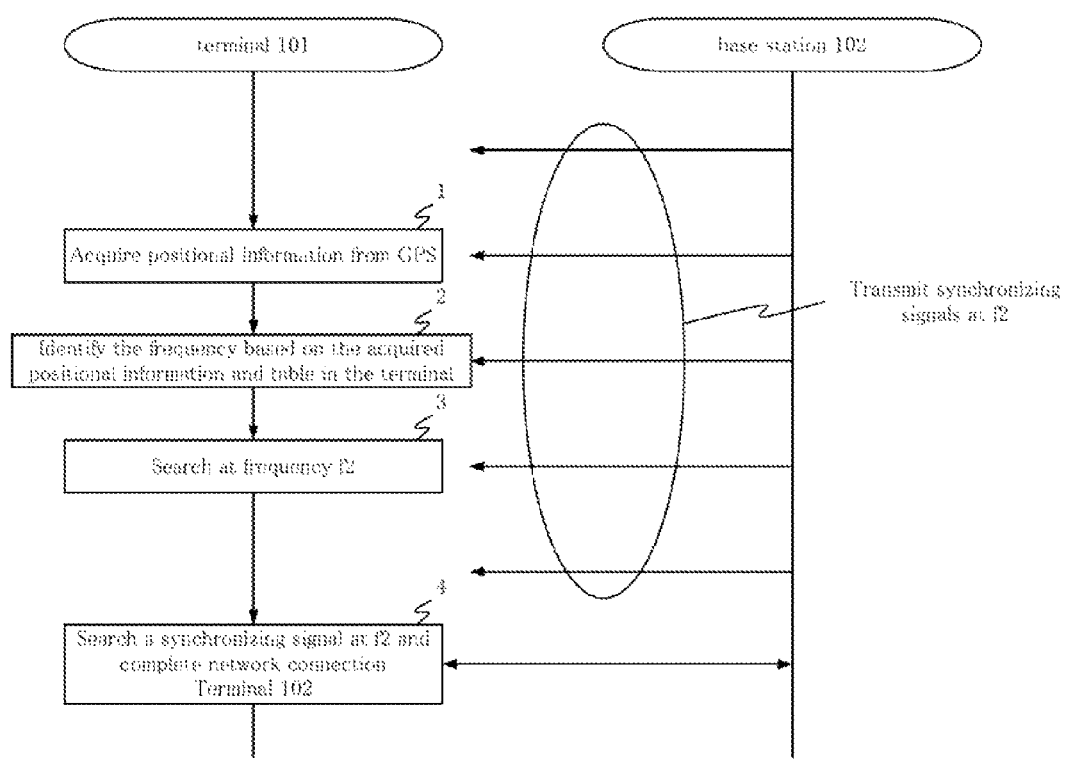
FIG. 6 is a sequence diagram for illustrating a method for establishing a connection between the terminal and base station in the mode shown in FIGS. 4 and 5.

FIG. 6 is a sequence diagram for illustrating the method for connection between terminal 101 and base station 102 in the mode showing in FIGS. 4 and 5. Here, the case where a synchronizing signal is transmitted from base station 102 using frequency f2 is described as an example.

The synchronizing signal is periodically transmitted from base station 102 using frequency f2.

First, at Step 1, positional information on terminal 101 is acquired from GPS satellite 104 by GPS module 113 of terminal 101.

Then, based on the acquired positional information and the information stored in storage 114 (the block identifying table and frequency identifying table, described hereinbelow), the frequency used at the position designated by the positional information is identified by controller 116 at Step 2.

Here, it is assumed in the communication system connected to network 103 shown in FIG. 4 that the communication range is divided into a plurality of sections each consisting of 16 kinds (patterns) of blocks depending on latitude and longitude. The 16 kinds of blocks are defined with different frequencies.

Figure 7:
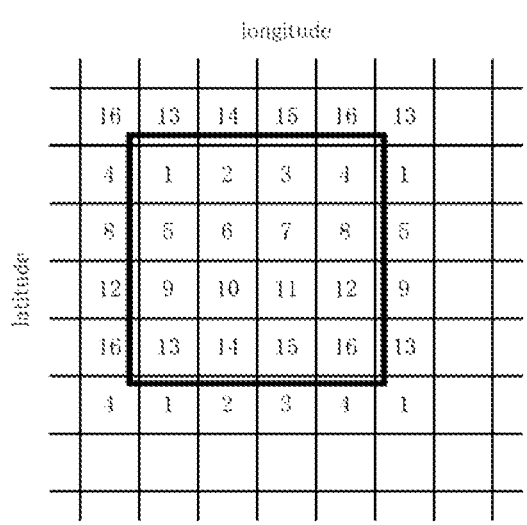
FIG. 7 is a diagram showing one example of a communication range that is divided into a plurality of sections each consisting of 16 kinds of blocks depending on latitude and longitude.

FIG. 7 is a diagram showing one example of the communication range that is divided into a plurality of sections each consisting of 16 kinds of blocks depending on latitude and longitude.

As shown in FIG. 7, the communication range is divided into a plurality of sections each consisting of 16 kinds of blocks (blocks 1 to 16) depending on latitude and longitude. In this system, an associated frequency is designated for each of the 16 kinds of blocks. Here, the size unit of one square (section) shown in FIG. 7 is 0° 04' represented in terms of latitude and longitude. That is, based on the two bits, or the third and fourth bits from the least significant bit, of the binarized values of the "X minutes" in terms of the longitude and latitude of the positional information, the block to which the position in question belongs can be identified.

FIG. 8 is a diagram showing one example of a configuration of a block identifying table stored in storage 114 shown in FIG. 5.

The block identifying table stored in storage 114 shown in FIG. 5 indicates the association between the predetermined bits of latitude and longitude and the positional information as shown in FIG. 8. Here, the predetermined bits of latitude and longitude use the two bits, or the third and fourth bits from the least significant bit, of the binarized values of the "X minutes" in terms of the longitude and latitude as stated above.

For example, the predetermined bits of latitude "00" and the predetermined bits of longitude "00" are made to correspond to positional information "block 1" and stored. This means that the positional information designated by the predetermined bits of latitude acquired by GPS module 113 being "00" and the predetermined bits of longitude being "00", is "block 1".

Similarly, the predetermined bits of latitude "00" and the predetermined bits of longitude "01" are made to correspond to positional information "block 2" and stored. This means that the positional information designated by the predetermined bits of latitude acquired by GPS module 113 being "00" and the predetermined bits of longitude being "01", is "block 2".

Similarly, the predetermined bits of latitude "00" and the predetermined bits of longitude "10" are made to correspond to positional information "block 3" and stored. This means that the positional information designated by the predetermined bits of latitude acquired by GPS module 113 being "00" and the predetermined bits of longitude being "10", is "block 3".

Similarly, the predetermined bits of latitude "00" and the predetermined bits of longitude "11" are made to correspond to positional information "block 4" and stored. This means that the positional information designated by the predetermined bits of latitude acquired by GPS module 113 being "00" and the predetermined bits of longitude being "11", is "block 4".

Similarly, the predetermined bits of latitude "01" and the predetermined bits of longitude "00" are made to correspond to positional information "block 5" and stored. This means that the positional information designated by the predetermined bits of latitude acquired by GPS module 113 being "01" and the predetermined bits of longitude being "00", is "block 5".

Similarly, the predetermined bits of latitude "01" and the predetermined bits of longitude "01" are made to correspond to positional information "block 6" and stored. This means that the positional information designated by the predetermined bits of latitude acquired by GPS module 113 being "01" and the predetermined bits of longitude being "01", is "block 6".

Similarly, the predetermined bits of latitude "01" and the predetermined bits of longitude "10" are made to correspond to positional information "block 7" and stored. This means that the positional information designated by the predetermined bits of latitude acquired by GPS module 113 being "01" and the predetermined bits of longitude being "10", is "block 7".

Similarly, the predetermined bits of latitude "01" and the predetermined bits of longitude "11" are made to correspond to positional information "block 8" and stored. This means that the positional information designated by the predetermined bits of latitude acquired by GPS module 113 being "01" and the predetermined bits of longitude being "11", is "block 8".

Similarly, the predetermined bits of latitude "10" and the predetermined bits of longitude "00" are made to correspond to positional information "block 9" and stored. This means that the positional information designated by the predetermined bits of latitude acquired by GPS module 113 being "10" and the predetermined bits of longitude being "00", is "block 9".

Similarly, the predetermined bits of latitude "10" and the predetermined bits of longitude "01" are made to correspond to positional information "block 10" and stored. This means that the positional information designated by the predetermined bits of latitude acquired by GPS module 113 being "10" and the predetermined bits of longitude being "01", is "block 10".

Similarly, the predetermined bits of latitude "10" and the predetermined bits of longitude "10" are made to correspond to positional information "block 11" and stored. This means that the positional information designated by the predetermined bits of latitude acquired by GPS module 113 being "10" and the predetermined bits of longitude being "10", is "block 11".

Similarly, the predetermined bits of latitude "10" and the predetermined bits of longitude "11" are made to correspond to positional information "block 12" and stored. This means that the positional information designated by the predetermined bits of latitude acquired by GPS module 113 being "10" and the predetermined bits of longitude being "11", is "block 12".

Similarly, the predetermined bits of latitude "11" and the predetermined bits of longitude "00" are made to correspond to positional information "block 13" and stored. This means that the positional information designated by the predetermined bits of latitude acquired by GPS module 113 being "11" and the predetermined bits of longitude being "00", is "block 13".

Similarly, the predetermined bits of latitude "11" and the predetermined bits of longitude "01" are made to correspond to positional information "block 14" and stored. This means that the positional information designated by the predetermined bits of latitude acquired by GPS module 113 being "11" and the predetermined bits of longitude being "01", is "block 14".

Similarly, the predetermined bits of latitude "11" and the predetermined bits of longitude "10" are made to correspond to positional information "block 15" and stored. This means that the positional information designated by the predetermined bits of latitude acquired by GPS module 113 being "11" and the predetermined bits of longitude being "10", is "block 15".

Similarly, the predetermined bits of latitude "11" and the predetermined bits of longitude "11" are made to correspond to positional information "block 16" and stored. This means that the positional information designated by the predetermined bits of latitude acquired by GPS module 113 being "11" and the predetermined bits of longitude being "11", is "block 16".

From this block identifying table, it is possible to obtain the positional information (block) based on only the predetermined bits of latitude and longitude, which are obtained by GPS module 113.

FIG. 9 is a diagram showing one example of a configuration of a frequency identifying table stored in storage 114 shown in FIG. 5.

The frequency identifying table stored in storage 114 shown in FIG. 5 indicates the correspondence between positional information and frequencies.

For example, positional information "block 1" and frequency "f1" are made correspondent and stored. This indicates that the frequency used when terminal 101 exists in "block 1" shown in FIG. 7 is "f1".

Similarly, positional information "block 2" and frequency "f2" are made correspondent and stored. This indicates that the frequency used when terminal 101 exists in "block 2" shown in FIG. 7 is "f2".

Similarly, positional information "block 3" and frequency "f3" are made correspondent and stored. This indicates that the frequency used when terminal 101 exists in "block 3" shown in FIG. 7 is "f3".

Similarly, positional information "block 15" and frequency "f5" are made correspondent and stored. This indicates that the frequency used when terminal 101 exists in "block 15" shown in FIG. 7 is "f5".

Similarly, positional information "block 16" and frequency "f6" are made correspondent and stored. This indicates that the frequency used when terminal 101 exists in "block 16" shown in FIG. 7 is "f6".

In this way, use of the frequency identifying table stored in storage 114 makes it possible to identify the frequency allotted in accordance with the position of each of 16 kinds of blocks.

Now, the size of each block shown in FIG. 7 will be described.

Figure 10:
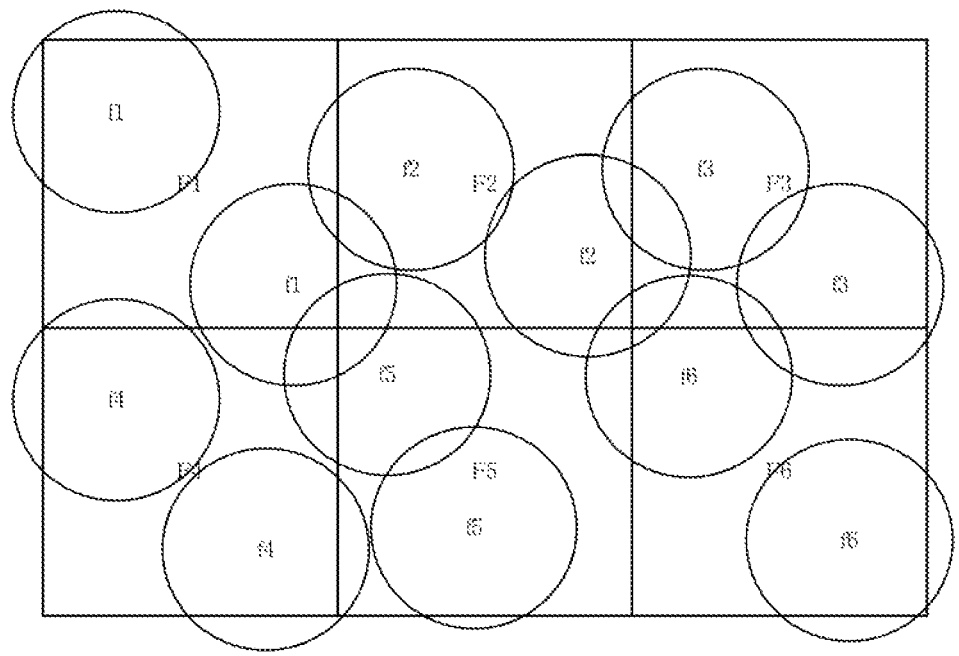
FIG. 10 is a diagram showing one example of the relationship between the frequencies calculated from general sectioned areas and the set frequencies of base stations in a WiMAX system.

FIG. 10 is a diagram showing one example of the relationship between the frequencies calculated from general sectioned areas (blocks in FIG. 7) and the set frequencies of base stations in a WiMAX system.

As shown in FIG. 10, when the frequencies calculated from the general sectioned areas (the squares in the drawing) are specified as F1 to F6 and the set frequencies for the base stations in the WiMAX system (the coverage areas of base stations are assumed to be the circles in the drawing) are denoted as f1 to f6, the frequency for the largest sectioned area included in the coverage area of a base station in the WiMAX system is determined as the set frequency. Alternatively, the frequency for the sectioned area in which the largest number of WiMAX terminals exist among the coverage areas of a base station may be determined as the set frequency for the base station.

Figure 11:
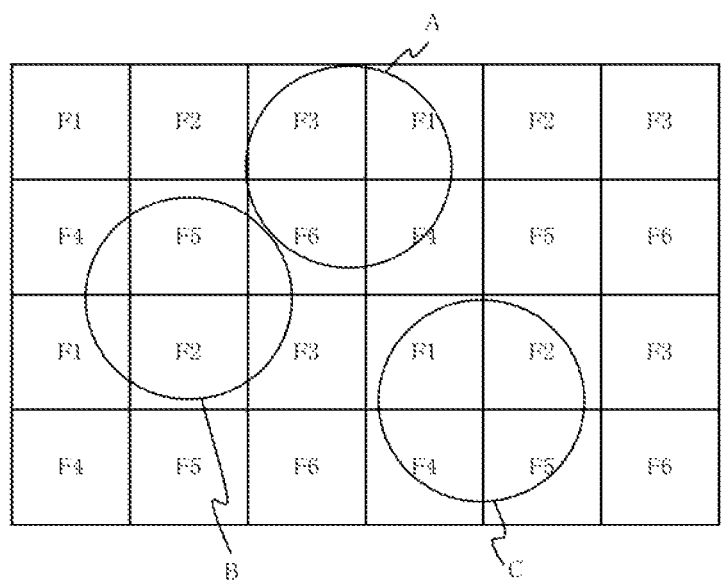
FIG. 11 is a diagram showing one example of frequency relationships when general sectioned areas are smaller than the coverage areas of base stations in a WiMAX system.

FIG. 11 is a diagram showing one example of frequency relationships when general sectioned areas are smaller than the coverage areas of base stations in the WiMAX system.

As shown in FIG. 11, for example, the frequency used for a base station that has a coverage area "A" may take multiple values F3, F1, F6 and F4. Also, the frequency used for a base station that has a coverage area "B" may take multiple values F4, F5, F6, F1, F2 and F3. Further, the frequency used for a base station that has a coverage area "C" may take multiple values F1, F2, F4 and F5. Accordingly, in order to allot the frequency to be calculated from a sectioned area to a base station in the WiMAX system with low ambiguity, it is necessary to take a broader sectioned area than the coverage area of the base station in the WiMAX system. For example, it is possible to take the length of the side of a sectioned area about twice as long as the diameter of the coverage area of a base station in the WiMAX system.

The tables shown in FIGS. 8 and 9 show only part of the correspondence information of frequencies associated with positional information corresponding to latitude and longitudinal for a broad range (e.g., the whole Japanese territory, or the like) stored in server 105 having a large capacity storage area, a part corresponding to a specific range (e.g., ward, city, prefecture, or the like) in which terminal 101 is present. In this case, based on the positional information on terminal 101 acquired by GPS module 113, a predetermined range (table range) is determined by controller 116 so that information on the determined table range is acquired. This table range may also be calculated based on positional information and a previously determined threshold. For example, when the threshold is given as a 10 kilometer radius, the range within a 10 kilometer radius from the position of terminal 101 obtained from GPS module 113 is determined as the table range and the corresponding information included in that range is acquired. Alternatively, based on the positional information on terminal 101 acquired by GPS module 113, the ward, city, prefecture or the like to which the position in question belongs, may be determined so that the determined ward, city, prefecture or the like may be determined to be the table range.

As to the method of acquisition, data may be acquired by directly connecting terminal 101 to server 105 or may be acquired from server 105 through network 103. Specifically, of the signals received by receiver 111, correspondence information is stored by controller 116 into storage 114. At this time, the information may be information that is stored in the format of each table shown in FIGS. 8 and 9.

For example, when the predetermined bits of the latitude indicated by the positional information acquired from GPS satellite 104 by GPS module 113 at Step 1 are "00" and the predetermined bits of the longitude are "01", the block identifying table stored in storage 114 is referred to by controller 116 so that terminal 101 is recognized to exist in block 2. Further, the frequency identifying table stored in storage 114 is referred to by controller 116 so that synchronizing signal frequency "f2" corresponding to block 2 is identified.

Then, a search of the synchronizing signal is performed using the identified frequency "f2" at Step 3. The synchronizing signal search is performed in a general method, or reception power control by power controller 112 is carried out.

After detection of the synchronizing signal, at Step 4, terminal 101 is connected to network 103 by way of base station 102 using frequency "f2" and the detected synchronizing signal.

Here, there are conceivable cases where terminal 101 cannot receive any signal that is transmitted from base station 102 at the identified frequency by using the above-described process.

A process when terminal 101 cannot receive any signal that is transmitted from base station 102 at the identified frequency by using the above-described process, will be described hereinbelow.

Figure 12:
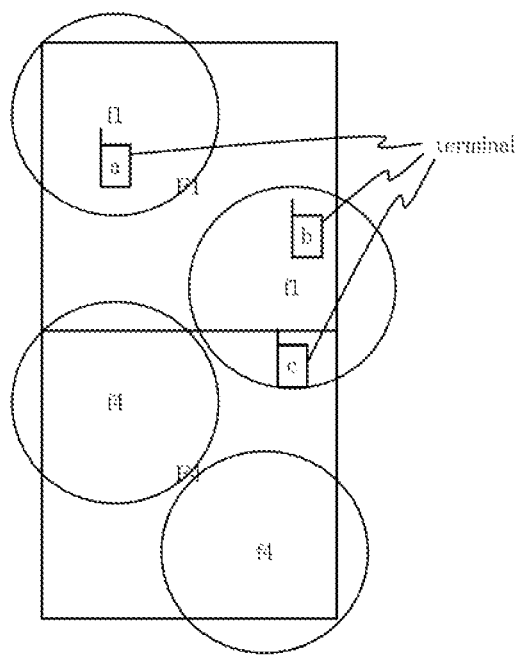
FIG. 12 is a diagram showing one example in which a terminal exists at a position where the terminal cannot receive the signal that is transmitted from base station at the identified frequency.

FIG. 12 is a diagram showing one example in which terminal 101 exists at a position where terminal 101 cannot receive the signal that is transmitted from base station 102 at the identified frequency.

As shown in FIG. 12, for example, terminal a and terminal b calculate frequency F1 based on the sectioned area. The frequency of the base stations in the WiMax system is also f1. Accordingly, it is possible to obtain the frequency correctly.

However, although the frequency calculated for terminal c based on the sectioned area is F4, the frequency of the base station of the WiMax system that can communicate with itself is not f4 but f1. As a result, it is impossible to obtain the frequency correctly at the frequency calculated based on the sectioned area.

Figure 1:
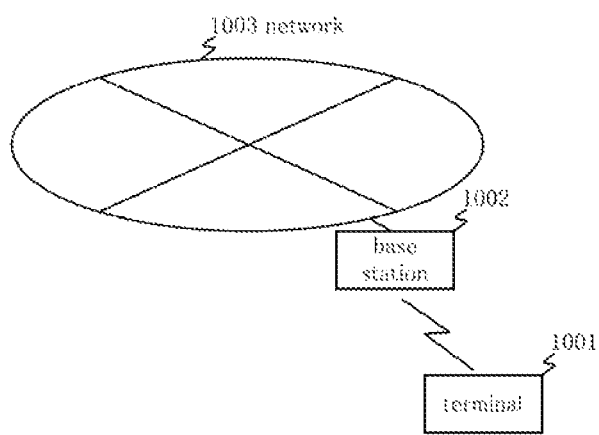
FIG. 1 is a diagram showing one mode of a typical radio communication system.
Figure 2:
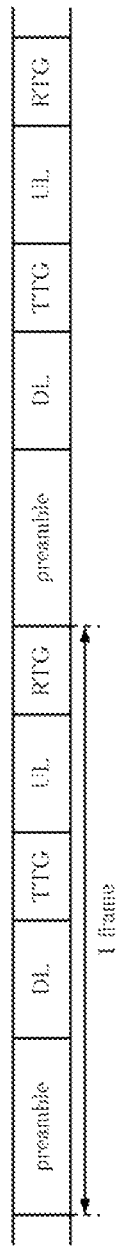
FIG. 2 is a diagram showing a format of data frames transmitted and received between a terminal and a base station when the network shown in FIG. 1 is a WiMAX network.
Figure 3:
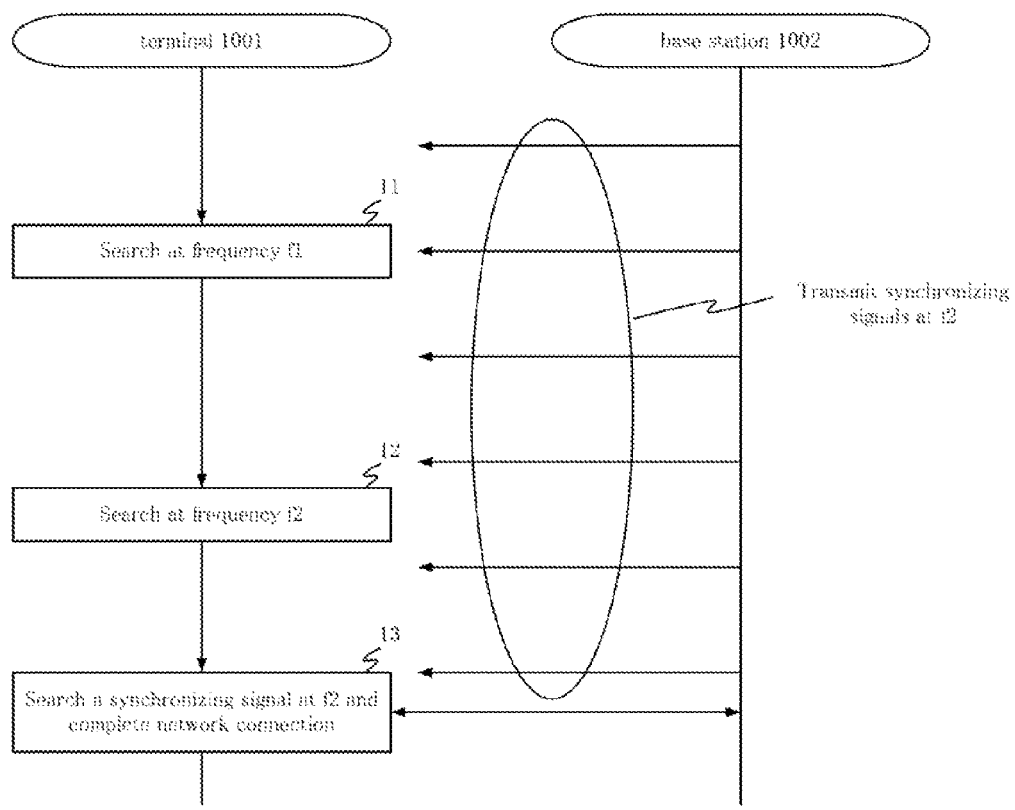
FIG. 3 is a sequence diagram for illustrating a typical synchronizing signal searching process at a terminal in the radio communication system shown in FIG. 1.

In this case, the general frequency searching operation described with reference to FIG. 3 is performed.

The aforementioned process of terminal 101 may be executed by logical circuits manufactured in accordance with purposes. Or, the program that describes the procedures of the processing content may be recorded into a recording medium that is readable at terminal 101, and the program recorded in this recording medium may be loaded into terminal 101 so as to be executed. The recording mediums readable at terminal 101 include, other than removable recording mediums such as floppy disks (registered trademark), magneto-optical disks, DVDs, CDs and the like, memory devices such as ROM, RAM etc., HDDs and the like that are built in terminal 101. The program recorded on this recording medium is loaded by controller 116 in terminal 101 and the same process as above is executed by controller 116. In this case, terminal 101 is an entity that operates as a computer to execute the program loaded from a recording medium with the program recorded thereon.

From the above, it is no longer necessary to perform sequential frequency searches when terminal 101 connects to network 103 through base station 102. Thereby, it is possible to easily shorten the time for terminal 101 to connect to network 103 and also to easily cut down the power consumption that is required for establishing a connection.

As the present invention has been described heretofore by referring to the exemplary embodiment, the present invention should not be limited to the above exemplary embodiment. Various changes that will be understood by those skilled in the art can be added to the configurations and details of the present invention within the scope of the present invention.

The invention claimed is:

1. A communication terminal having a radio communicating function, the communication terminal comprising:

a Global Positioning System (GPS) module that acquires positional information from a GPS satellite, indicating the position at which the communication terminal is present;

a controller which determines a range of correspondence information to be acquired, the range of correspondence information comprising a plurality of sections that are divided based on binarized values of latitude and longitude components of the positional information and a previously determined threshold, and each section corresponding to a frequency to be used at that respective section; and, a receiver that acquires the correspondence information included in the range from a server, wherein the controller further identifies, based on the positional information acquired by the GPS module and the correspondence information included in the range acquired by the receiver, the frequency to be used between the communication terminal and a radio base station to be connected to the communication terminal.

2. The communication terminal according to claim 1, further comprising a storage that stores the correspondence information acquired by the receiver, wherein the controller, based on the positional information acquired by the GPS module and the correspondence information stored in the storage, identifies the frequency to be used between the communication terminal and the radio base station.

3. The communication terminal according to claim 1, wherein the terminal is connected to a World Interoperability for Microwave Access (WiMAX) network through the radio base station.

4. A connecting method for connecting a communication terminal to a network through a radio base station, the method comprising the steps of:

acquiring positional information from a Global Positional System (GPS) satellite, indicating the position at which the communication terminal is present;

determining a range of correspondence information to be acquired, the range of correspondence information comprising a plurality of sections that are divided based on binarized values of latitude and longitude components of the positional information and a previously determined threshold, and each section corresponding to a frequency to be used at that respective section;

acquiring the correspondence information included in the range from a server; and, identifying the frequency to be used between the communication terminal and the radio base station to be connected to the communication terminal, based on the acquired positional information and the correspondence information included in the range.

5. The connecting method according to claim 4, further comprising the steps of:

storing the correspondence information included in the range in the communication terminal; and, identifying the frequency to be used between the communication terminal and the radio base station, based on the acquired positional information and the stored correspondence information.

6. A non-transitory computer readable storage medium storing a program that causes a communication terminal having a radio communication function to execute:
- a procedure of acquiring positional information from a Global Positioning System (GPS) satellite, indicating the position at which the communication terminal is present;
- a procedure of determining a range of correspondence information to be acquired, the range of correspondence information comprising a plurality of sections that are divided based on binarized values of latitude and longitude components of the positional information and a previously determined threshold, and each section corresponding to a frequency to be used at that respective section;
- a procedure of acquiring the correspondence information included in the range from a server; and, a procedure of identifying the frequency to be used between the communication terminal and the radio base station to be connected to the communication terminal, based on the acquired positional information and the correspondence information included in the range.

7. The non-transitory computer readable storage medium according to claim 6, storing the program that causes the communication terminal to execute:
- a procedure of storing the correspondence information included in the range in the communication terminal; and,
- a procedure of identifying the frequency to be used between the communication terminal and the radio base station, based on the acquired positional information and the stored correspondence information.

* * * * *